(No Model.)
G. S. KAIME & O. STENERSON.
LOG ROLLING HOOK.
No. 524,595. Patented Aug. 14, 1894.
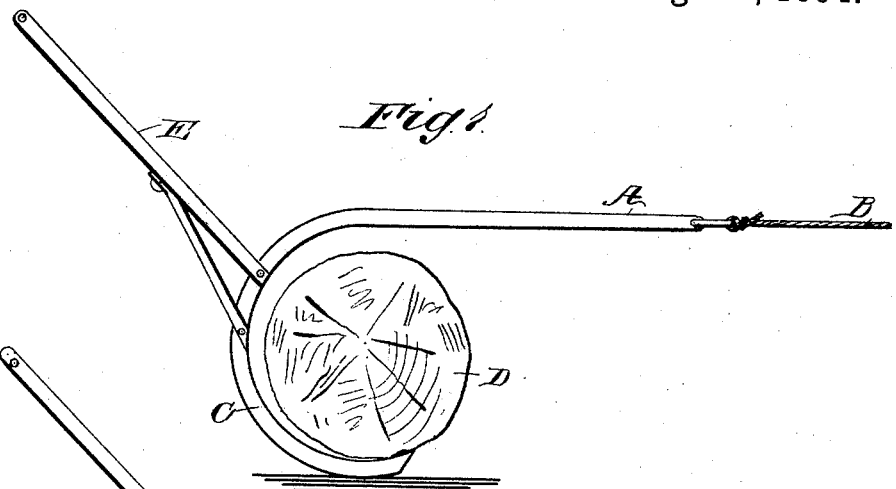
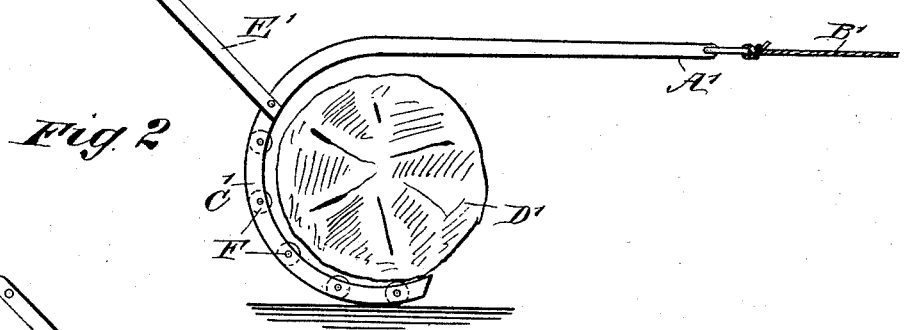
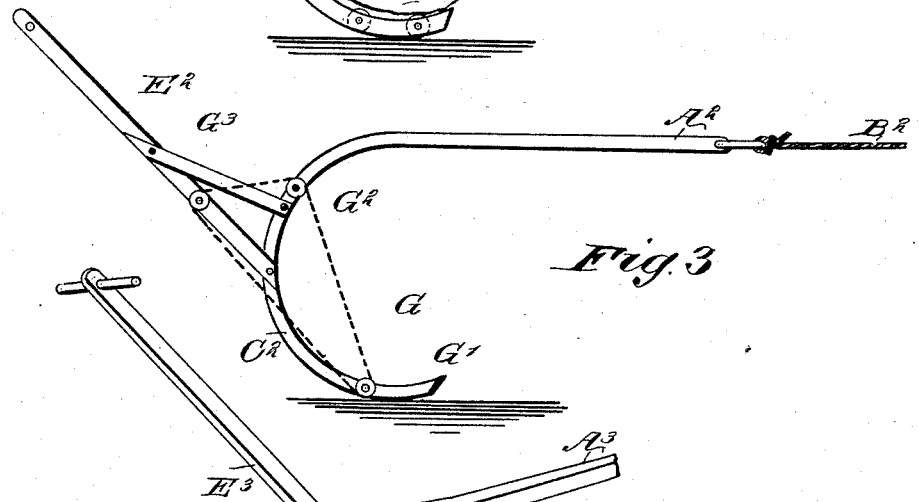
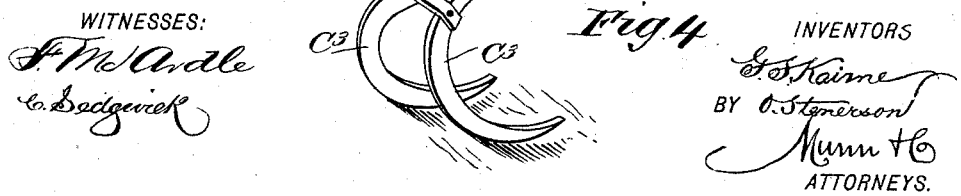

UNITED STATES PATENT OFFICE.

GEORGE S. KAIME AND OLE STENERSON, OF NECEDAH, WISCONSIN.

LOG-ROLLING HOOK.

SPECIFICATION forming part of Letters Patent No. 524,595, dated August 14, 1894.

Application filed October 25, 1893. Serial No. 489,089. (No model.)

*To all whom it may concern:*

Be it known that we, GEORGE S. KAIME and OLE STENERSON, both of Necedah, in the county of Juneau and State of Wisconsin, have invented a new and Improved Log-Rolling Hook, of which the following is a full, clear, and exact description.

The invention relates to implements for handling logs, and the object of the invention is to provide a new and improved log-rolling hook, which is simple and durable in construction, and arranged to permit of conveniently rolling a log in the desired direction over the ground or on skids, and without exerting much power.

Reference is to be had to the accompanying drawings, forming a part of this specification, in which similar letters of reference indicate corresponding parts in all the views.

Figure 1 is a side elevation of the improvement. Fig. 2 is a like view of a modified form of the same. Fig. 3 is a similar view of another modified form of the same; and Fig. 4 is a perspective view showing a double branched construction of either of the foregoing forms.

The improved log-rolling hook is provided with a draft beam A, connected at its forward end with a rope or chain B, leading to a winding drum or other mechanism for exerting a pull on the said rope or chain, to pull the draft beam A forward to roll the log, as will be more fully described.

On the rear end of the draft beam A, is formed or secured a hook C, curved downward and forward approximately in a semicircle, as plainly illustrated in the drawings. The hook C is adapted to engage a log D, so that the latter can revolve in the said hook when a pull is exerted on the draft beam A, the ends of the log resting on the ground or on skids, as the case may be. On the hook C is secured a rearwardly and upwardly-extending handle E, adapted to be taken hold of by the operator to apply the hook C on the log D, and to move it over the log lengthwise to properly guide the hook, and to cause the log to roll in the desired direction.

As illustrated in Fig. 2, the draft beam A' is provided with a rope or chain B' and a hook C', and the latter carries a series of friction rollers F, projecting beyond the inner edge of the hook, so that the log D' rests on the said rollers to reduce the friction at the time power is exerted on the hook. The hook C' is also provided with the handle E', similar to the one shown in Fig. 1.

As shown in Fig. 3, the draft beam $A^2$ is provided with the rope or chain $B^2$ and the hook $C^2$, and in the latter extends an endless chain G, passing over rollers G', $G^2$ and $G^3$, of which the roller G' is preferably arranged at or near the point of the hook $C^2$ and the other roller $G^2$ near the upper end of the hook. The third roller $G^3$ is held in the handle $E^2$ so that two parts of the chain extend from the point of the hook rearward and upward, to engage the log to be rolled forward. This endless chain G, like the rollers F, forms on the concave side of the hook an antifriction bearing surface that moves with the log as it rolls or turns axially, and affords in addition a cushioning effect to the log.

As illustrated in Fig. 4, the hook is crotched, and is formed with two members $C^3$, extending from the draft beam $A^3$, the said members being connected with each other by the forked ends of the handle $E^3$.

It is understood that in all the forms described the operation is the same; that is, when power is exerted on the draft beam A and the hook C engages the log, then the log turns in the hook and along the ground or the skids as the case may be.

It is further understood that logs on account of having different sized ends, roll faster near the base than at the small end if a pull is exerted on the log at the middle, but by this device the hook can be conveniently moved on the log nearer to the small end, so that this end is pulled forward faster to keep the log in the desired direction.

Having thus described our invention, we claim as new and desire to secure by Letters Patent—

1. A log rolling device, comprising a draft beam, hooks attached thereto and extending downwardly and forwardly and forming a seat within which the log may turn, the said hooks being arranged to bear against the log in more than one plane to prevent the log from swinging to an oblique position, substantially as shown and described.

2. A log rolling device, comprising a draft beam, a hook connected to said draft beam and curving downwardly and forwardly, handles projecting rearwardly from the hook, and anti-friction bearing surfaces arranged within the concave side of the hook to move with the log as it turns axially, substantially as shown and described.

3. A log-rolling hook, comprising a draft beam, a hook extending from the said draft beam and curved downward and forward approximately in a semi-circle, a handle on the said hook and extending rearward and upward, and friction rollers journaled in the said hook, substantially as shown and described.

GEORGE S. KAIME.
OLE STENERSON.

Witnesses:
J. H. SPENCER,
L. G. BISHOP.